United States Patent
Reinhard et al.

(10) Patent No.: US 10,032,261 B2
(45) Date of Patent: Jul. 24, 2018

(54) METHODS, SYSTEMS AND APPARATUS FOR OVER-EXPOSURE CORRECTION

(71) Applicant: THOMSON LICENSING, Issy les Moulineaux (FR)

(72) Inventors: Erik Reinhard, Hédé-Bazouges (FR); Fatma Hawary, Rennes (FR); Mehmet Turkan, Rennes (FR)

(73) Assignee: THOMSON LICENSING, Issy les Moulineaux (FR)

( * ) Notice: Subject to any disclaimer, the term of this patent is extended or adjusted under 35 U.S.C. 154(b) by 4 days.

(21) Appl. No.: 15/255,662

(22) Filed: Sep. 2, 2016

(65) Prior Publication Data

US 2017/0061592 A1  Mar. 2, 2017

(30) Foreign Application Priority Data

Sep. 2, 2015 (EP) .................................... 15306350

(51) Int. Cl.
*G06K 9/00* (2006.01)
*G06T 5/00* (2006.01)
*G06T 7/00* (2017.01)

(52) U.S. Cl.
CPC .............. *G06T 5/008* (2013.01); *G06T 5/005* (2013.01); *G06T 7/0085* (2013.01)

(58) Field of Classification Search
CPC ........... G06T 5/008; G06T 5/001; G06T 5/40; G06T 7/0085; H04N 1/6027; H04N 1/60; H04N 9/045
See application file for complete search history.

(56) References Cited

U.S. PATENT DOCUMENTS 5,680,230 A * 10/1997 Kaburagi ................. H04N 1/56
358/518
8,593,480 B1 * 11/2013 Ballestad ............. H04N 1/6027
345/581

(Continued)

OTHER PUBLICATIONS

Didyk et al., "Enhancement of Bright Video Features for HDR Displays", Computer Graphics Forum, vol. 27, No. 4, Sep. 10, 2008, pp. 1265-1274.

(Continued)

*Primary Examiner* — Amir Alavi
(74) *Attorney, Agent, or Firm* — Brian J. Dorini; Patricia A. Verlangieri

(57) ABSTRACT

An aspect of present principles is directed to methods, apparatus, systems and computer readable media for image processing. The image processing may include receiving a standard dynamic range (SDR) image or a receiver for receiving a standard dynamic range (SDR) image. It may further include determining an over-exposed region of the SDR image and determining a corrected luminance value for at least a pixel of the over-exposed region, or a processor configured to determine an over-exposed region of the SDR image and a corrected luminance value for at least a pixel of the over-exposed region. The corrected luminance value is determined based on at least one of a shape of the over-exposed region, luminance information of pixels surrounding the over-exposed region, and edge information of the pixels surrounding the over-exposed region. The over-exposed region may be an irregularly shaped region.

26 Claims, 10 Drawing Sheets

(56) References Cited

U.S. PATENT DOCUMENTS

| | | | |
|---|---|---|---|
| 9,299,317 B2* | 3/2016 | Ward | G06T 5/40 |
| 2012/0288192 A1 | 11/2012 | Heidrich et al. | |
| 2015/0124124 A1* | 5/2015 | Maeyama | H04N 5/2355 348/235 |
| 2016/0205338 A1* | 7/2016 | Kozuka | H04N 5/20 348/687 |
| 2016/0372057 A1* | 12/2016 | Katsu | G09G 3/2092 |
| 2017/0061592 A1* | 3/2017 | Reinhard | G06T 5/008 |
| 2017/0257529 A1* | 9/2017 | Ramasubramonian | G06T 7/90 |

OTHER PUBLICATIONS

Abebe et al., "Color Clipping and Over-exposure Correction for Videos and Still Images", Eurographics Symposium on Rendering (Experimental Ideas & Implementations track), Darmstadt, Germany, Jun. 23, 2015, pp. 1-11.

Assefa et al., "Correction of Over-Exposure using Color Channel Correlations", IEEE GlobalSIP 2014: Perception Inspired Multimedia Signal Processing Techniques, Atlanta, Georgia, USA, Dec. 3, 2014, pp. 1078-1082.

Pouli et al., "Image Statistics in Visual Computing", A K Peters/CRC Press, Boca Raton, 2013, pp. 1-7.

Rempel et al., "Ldr2hdr: On-the-fly Reverse Tone Mapping of Legacy Video and Photographs", 34th International Conference and Exhibition on Computer Graphics and Interactive Techniques, San Diego, California, USA, Aug. 7, 2007, pp. 1-6.

Wang et al., "High Dynamic Range Image Hallucination", 18th Eurographics Conference on Rendering Techniques, Prague, Czech Republic, Sep. 3, 2007, pp. 321-326.

Guo et al., "Correcting Over-Exposure in Photographs", IEEE Conference on Computer Vision and Pattern Recognition, San Francisco, California, USA, Jun. 13, 2010, pp. 515-521.

Hou et al., "Recovering Over/Underexposed Regions in Photographs", SIAM Journal of Imaging Sciences, vol. 6, No. 4, 2013, pp. 2213-2235.

Rouf et al., Gradient Domain Color Restoration of Clipped Highlights, IEEE Conference on Computer Vision and Pattern Recognition Workshops, Providence, Rhode Island, USA, Jun. 16, 2012, pp. 7-14.

Elboher et al., "Recovering Color and Details of Clipped Image Régions", International Journal of Computer Information Systems and Industrial Management Applications, vol. 3, 2011, pp. 812-819.

Lee et al., "Correction of the Overexposed Region in Digital Color Image" IEEE Transactions on Consumer Electronics, vol. 60, No. 2, Jul. 14, 2014, pp. 173-178.

Bertalmio et al., "Image Inpainting", SIGGRAPH 2000 Conference on Computer Graphics, New Orleans, Louisiana, USA, Jul. 23, 2000, pp. 417-424.

Bornemann et al., "Fast Image Inpainting Based on Coherence Transport", Journal of Mathematical Imaging and Vision, vol. 28, No. 3, Aug. 31, 2007, pp. 259-278.

Abebe et al., "Color Clipping and Over-exposure Correction", 26th Eurographics Symposium on Rendering—Experimental Ideas & Implementations track, Darmstadt, Germany, Jun. 24, 2015, pp. 1-12.

* cited by examiner

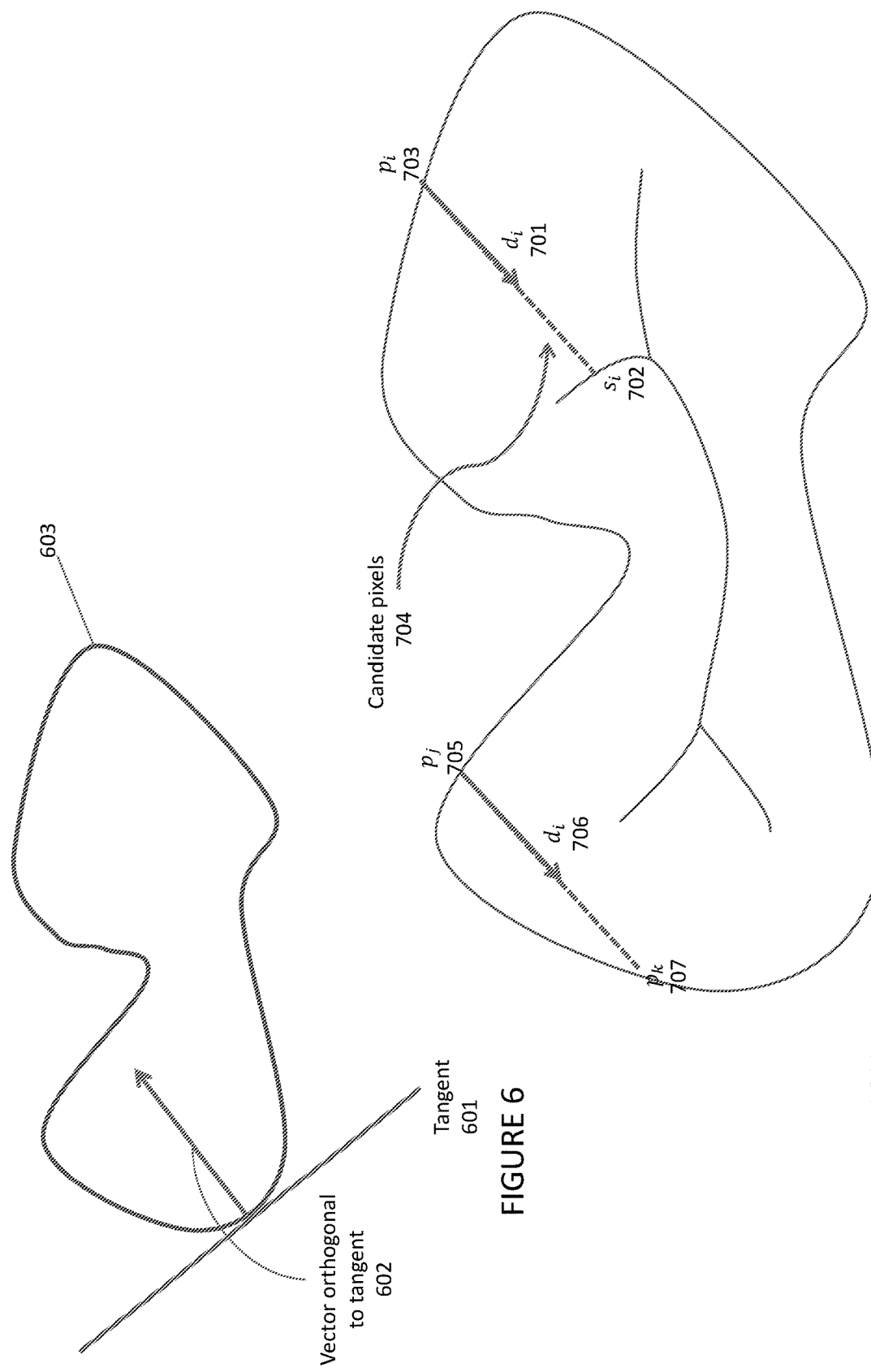

METHODS, SYSTEMS AND APPARATUS FOR OVER-EXPOSURE CORRECTION

REFERENCE TO RELATED EUROPEAN APPLICATION

This application claims priority from European Application No. 15306350.8, entitled "Methods, Systems and Apparatus for Over-Exposure Correction," filed on Sep. 2, 2015, the contents of which are hereby incorporated by reference in its entirety.

TECHNICAL FIELD

The present disclosure relates to image processing and image restoration. In particular, the present disclosure relates to correction of over-exposed or clipped specular image region(s).

BACKGROUND

Cameras typically have a smaller dynamic range than real world scenes. Bright image parts that exceed a camera's dynamic range will appear as over-exposed or clipped areas. A camera will assign the maximum possible value of a color channel to such over-exposed or clipped areas. However, assigning this maximum value results in a loss of color, texture, contrast and luminance information in such areas.

Specular or shiny objects, such as cars or metal objects, have specular surfaces that tend to result in over-exposed or clipped image areas when imaged with a camera sensor. Specular surfaces tend to have highlights which need to be accurately (or at least plausibly) reproduced to convey the specular appearance.

Inpainting is the process of reconstructing image regions of missing image information, such as information of over-exposed or clipped regions. Inpainting typically analyzes information surrounding the missing information region and propagates or copies information from similar, surrounding regions to the missing information region. However, this is not successful when the region to be reconstructed is not similar to its surroundings. In particular, this is not successful for specular highlight regions because such regions have different properties than their surroundings.

Specular highlight regions have a peaked luminance profile which is not well-represented in neighboring image areas. Moreover, the luminance values of the over-exposed image regions exceed those of the remaining image, hence propagating or copying information from elsewhere in the image is not applicable.

The presence of over-exposed regions leads to a degraded visual appearance on conventional displays. However, this problem is exacerbated when imagery with over-exposed content is prepared for display on a high dynamic range (HDR) display. Standard dynamic range (SDR) content can generally be prepared for display on an HDR device with the aid of an inverse tone reproduction operator (also known as an inverse tone mapping operator, or iTMO for short). iTMOs expand a dynamic range non-linearly and bright image regions especially receive the largest expansion. As a consequence, featureless over-exposed regions may be emphasized and become even less visually attractive.

Pouli et al., 'Image Statistics in Visual Computing', A K Peters/CRC Press, 2013 provide an overview of statistical regularities found in natural images, and report that many RGB-like color spaces show strong correlations between color channels for natural images. This property can be leveraged for reconstruction of regions with one or two clipped channels. For example, Abebe et al., 'Color Clipping and Over-exposure Correction', Eurographics Symposium on Rendering (Experimental Ideas & Implementations track), 2015 describe a correction method, which relies on the correlation between RGB channels of color images to recover regions where one and two channels are clipped. A brightness reshaping method is used when all three channels are clipped. Abebe et al., 'Correction of Over-Exposure using Color Channel Correlations', IEEE GlobalSIP, 2014, describe a further method that leverages cross-channel correlations to reconstruct clipped regions.

Rempel et al., Ldr2hdr: on-the-fly reverse tone mapping of legacy video and photographs. In ACM Transactions on Graphics (TOG), August 2007, Vol. 26, No. 3, p. 39, describe an inverse tone mapping technique that includes reconstruction of over-exposed regions by applying Gaussian convolution to the mask that indicates over-exposed regions. The convolved mask is multiplied by an edge-stopping function that is applied to the same input mask, and the resulting profile is added to the inverse tone mapped image.

If no information is present, i.e. in over-exposed regions, some techniques propose to super-impose a simple Gaussian luminance profile to give shape to these regions. For example, Wang et al., High dynamic range image hallucination, In Proceedings of the 18th Eurographics conference on Rendering Techniques, June 2007 (pp. 321-326), discuss processing image luminance with a bilateral filter to produce a low frequency representation of luminance. A high frequency representation is obtained based on the residual between the image and the low frequency version. A circularly symmetric Gaussian profile is superimposed to create new luminance profiles to each clipped region. Wang requires a user to select a texture reference by marking the image with one or more strokes. The texture is propagated into the clipped area via a texture synthesis process. The new luminance profile, the texture and the original image are blended through Poisson editing to smooth transitions.

Guo et al., Correcting over-exposure in photographs, In Computer Vision and Pattern Recognition (CVPR), 2010 IEEE Conference, June 2010, (pp. 515-521) recreate a luminance profile through an optimization process that takes into account the likelihood of over-exposure of each pixel.

Hou et al., Recovering Over-/Underexposed Regions in Photographs, 2013, SIAM J. Imaging Sciences, 6(4), 2213-2235 discusses separating an image into lightness and chrominance information by operating in the CIE Lab color space. They propose to use inpainting lightness values by smoothing and attenuating wavelet coefficients. The lightness profile created may be compressed through tone mapping. The chromatic channels are inpainted using a similar procedure where wavelet coefficients are smoothed. An additional adjustment/normalization takes into account the lightness adjustments.

Rouf et al., Gradient domain color restoration of clipped highlights, June 2012, In Computer Vision and Pattern Recognition Workshops (CVPRW), 2012 IEEE Computer Society Conference on (pp. 7-14). IEEE, focus on hue restoration in clipped areas. For over-exposed regions, gradient values at the boundary are smoothed to avoid boundary artefacts, and to reconstruct a Gaussian profile.

Elboher et al., Recovering color and details of clipped image regions, June 2012, Proc. CGVCVIP, discuss a color correction method for clipped image regions based on color lines, i.e. linear structures identified in 3D plots of pixel values.

SUMMARY OF PRESENT PRINCIPLES

An aspect of present principles is directed to methods, apparatus, systems and computer readable media for image processing. The image processing may include receiving a standard dynamic range (SDR) image or a receiver for receiving a standard dynamic range (SDR) image. It may further include determining an over-exposed region of the SDR image and determining a corrected luminance value for at least a pixel of the over-exposed region, or a processor configured to determine an over-exposed region of the SDR image and a corrected luminance value for at least a pixel of the over-exposed region. The corrected luminance value is determined based on at least one of a shape of the over-exposed region, luminance information of pixels surrounding the over-exposed region, and edge information of the pixels surrounding the over-exposed region. The over-exposed region may be an irregularly shaped region.

There may be further determined the type of the over-exposed region and determining the corrected luminance based on the type of the over-exposed region. The type may be one of a specular highlight region, diffuse, or light sources.

The luminance may be corrected based on a skeleton of the over-exposed region. The luminance may be corrected based on peak luminance of pixels along the skeleton. The luminance may be corrected based on a ring of pixels surrounding the over exposed area.

The luminance may be corrected based on edges determined based on the ring of pixel. The luminance may be corrected based on direction vectors determined based on the ring of pixels. The direction vectors may be determined based on isophote vectors of the ring of pixels. The direction vectors may be determined based on gradients of the ring of pixels. The luminance may be corrected based on a luminance at the edge pixel $L(p_j)$, a gradient $g_j$ of an edge pixel, a distance between the edge pixel and the interior pixel, and a user parameter $\eta$ as follows: $L(o_i)=\eta g_j \|p_j-o_i\|+L(p_j)$.

The luminance may be corrected based on a luminance at the skeleton $L(s_j)$, a luminance at the edge pixel $L(p_j)$, a distance between the edge pixel and the interior pixel, a distance between the edge pixel and the skeleton pixel, and a user parameter $\eta$ as follows:

$$L(o_i) = \eta \frac{L(s_j) - L(p_j)}{\|p_j - s_j\|} \|p_j - o_i\| + L(p_j).$$

There may further be included refining the corrected luminance based on the optimization:

$$\operatorname*{argmin}_{L'} \|L' - L\|_2^2$$

subject to one or more of the constraints $\min(L'(o_i))-\max(L(p_j))>T_1$; $L'(o_i)-L_{orig}(o_i)>T_2$; $\|L'(o_i(y))\|_\infty - L'(s(y))<T_3$; $\|L'(o_i(x))\|_\infty - L'(s(x))<T_3$; $L'(p_j+t_1 d_j) \geq L'(p_j+t_2 d_j)$ if $t_1 > t_2$. The constraints may be based on relationships between optimized luminance values $L'(o_i)$, the luminance of edge pixels $L(p_j)$, luminance values of the input image $L_{orig}(o_i)$, optimized luminance values of skeleton pixels $L'(s(y))$, edge pixels $p_j$, direction vectors $d_j$, thresholds $T_1$, $T_2$, $T_3$ and scalars $t_1$ and $t_2$.

BRIEF SUMMARY OF THE DRAWINGS

The features and advantages of the present invention may be apparent from the detailed description below when taken in conjunction with the Figures described below:

FIG. 6 illustrates an example a tangent and orthogonal vector to the tangent of an over-exposed region.

FIG. 7 illustrates an example of candidate pixels of an over-exposed region.

DETAILED DESCRIPTION

Figure 1:
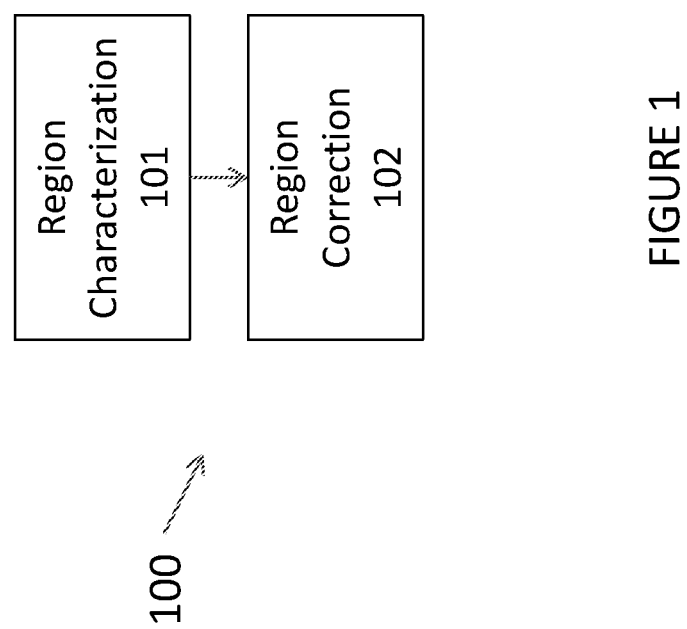
FIG. 1 is a diagram depicting an exemplary method in accordance with present principles.

The present principles are directed to methods, apparatus and systems for correct and/or reconstruction of over-exposed image region(s). In one example, over-exposed region(s) may be reconstructed by analyzing isophote lines of well-exposed pixels surrounding the over exposed region(s).

As used herein, "isophote lines" may be defined as lines with directions orthogonal to the gradient of a region. As used herein, "well-exposed" pixels may be defined as pixels that are not part of over-exposed region(s). A "region" may be defined as a plurality of pixels that are grouped together. Pixels are grouped together if each pixel of the group is connected to at least one other pixel of the group. An image may have multiple such regions.

Clipped or over-exposed image regions are typically those where one, two or three color channels have reached the maximum representable pixel value. An aspect of present principles is directed to reconstructing image regions where all three color channels have reached the maximum representable pixel value. However, image regions where only one or two channels have maximum pixel values may be based on an additional a preprocessing step.

As used herein, subscripts i and j may be used interchangeably. If both subscripts appear in the same equation, however, then they indicate different sets. For example, an over exposed region's interior pixel in the set $O=\{o_i\}$ may appear in an equation as $o_j$ to differentiate from an edge pixel $p_i$. On the other hand, if the subscript for different sets is the same, then corresponding pixel information is assumed. For instance, $p_j$ and $d_j$ used together would indicate a pixel position and its corresponding direction.

An aspect of present principles is directed to correcting over-exposed regions in an image processing pipeline. In one example, an aspect of present principles is directed to reconstructing over-exposed or clipped regions in a device (e.g., set-top box, computer, tablet, smartphone, laptop or any other device capable of providing information for display). In one example, SDR image content is converted to HDR for an HDR display device. In another example, over-exposed or clipped regions of an image can be reconstructed during a capture process. For example, during image capture (e.g., by a camera, smartphone), the image can be enhanced in accordance with present principles. In another example, an aspect of present principles is directed to reconstructing over-exposed or clipped regions during post-production. An aspect of present principles relates to a low frequency reconstruction algorithm for over-exposed regions. An aspect of present principles relates to fitting a low-frequency luminance profile to an over-exposed region by taking into account the shape of the region as well as information taken from areas immediately surrounding the over-exposed region.

An aspect of present principles is directed to luminance correction or reconstruction of over-exposed regions to reduce undesirable, visual attention. An aspect of present principles is directed to improving plausible reconstruction of over-exposed areas based on size and shape of over-exposed regions, as well as image information such as luminance values, gradient values, isophote directions and/or gradient directions of well-exposed content surrounding the over-exposed regions. An aspect of present principles is directed to seamlessly visually blending corrected luminance pixels with non-corrected pixels based on an optimization process.

Figure 2:
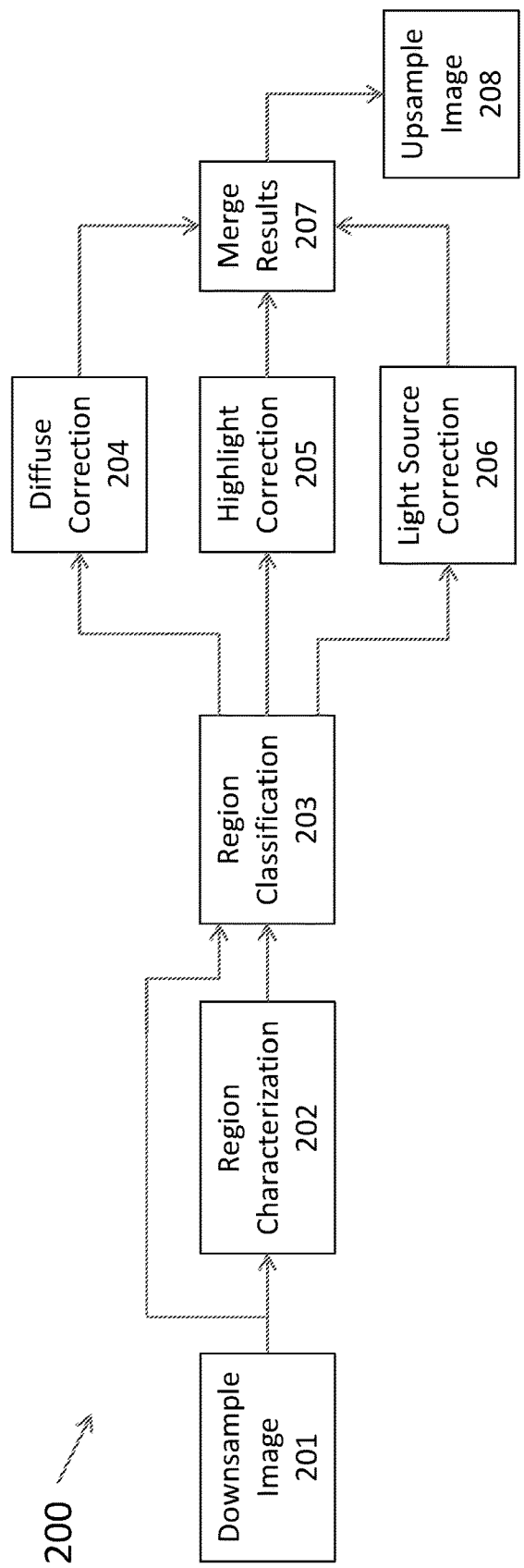
FIG. 2 is a diagram depicting an exemplary method in accordance with present principles.
Figure 3:
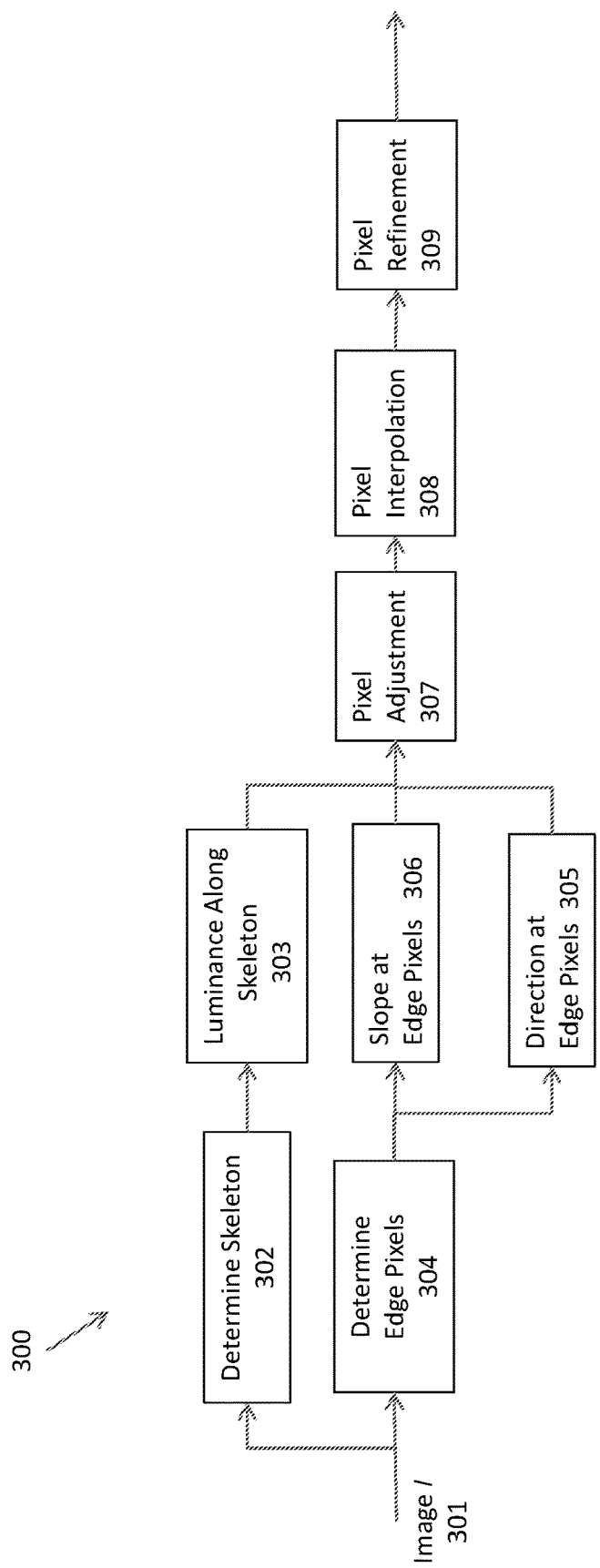
FIG. 3 is a diagram depicting an exemplary method in accordance with present principles.

FIGS. 1, 2, and 3 illustrate exemplary luminance profile reconstruction methods. FIG. 1 illustrates a method 100 for luminance profile reconstruction. Method 100 may include a block 101 for region characterization. Block 101 may characterize the shapes of image region(s) for an input image. Block 101 may pass control to block 102. Block 102 may perform region correction. Optionally, luminance profile reconstruction may include image downsampling (e.g., prior to block 101) and upsampling (e.g., after block 102). Such sampling may account for a region's lack of high spatial frequencies. Processing volume may be reduced by processing lower pixel resolutions.

FIG. 2 illustrates a method 200 for performing luminance profile reconstruction. Method 200 may include a block 201 for downsampling an input image. In one example, block 201 may be optional. Block 202 may perform region characterization. Block 203 may perform region classification by classifying each of the over-exposed region(s). For example, block 203 may determine whether the over-exposed region was a specular highlight, a diffuse surface, or a light source. A dedicated reconstruction algorithm may be determined based on the surface type determined by block 203. For example, for a diffuse region, block 204 may perform diffuse surface correction. For a specular highlight region, block 205 may perform specular highlight region reconstruction. For a light source, block 206 may perform light source correction. The corrections resulting from blocks 204, 205 and 206 may be merged (block 207 in FIG. 2) to produce a corrected image. Block 208 may upsample the corrected image to the resolution of the input image. In one example, block 208 may be optional.

An aspect of present principles is directed to region characterization. The region characterization may be performed by block 101 of FIG. 1 and block 202 of FIG. 2. An aspect of present principles is directed to region correction. Region correction may be performed by block 102 of FIG. 1 and one or more of blocks 204, 205 and 206 of FIG. 2.

FIG. 3 illustrates an exemplary method 300 for region correction in accordance with present principles. Method 300 may commence upon receiving an input image I 301. In one example, additional information regarding an image, such as an identification of over-exposed regions may also be provided. Each region may be identified by, for example, a mask M. The mask may have the same size as the input image and may have binary values indicating which pixels belong to the over-exposed regions. In one example, the over-exposed pixels may be determined based on a threshold value τ. For example, pixels with values equal to or greater than the threshold value may be identified as over-exposed pixels.

Figure 5B:
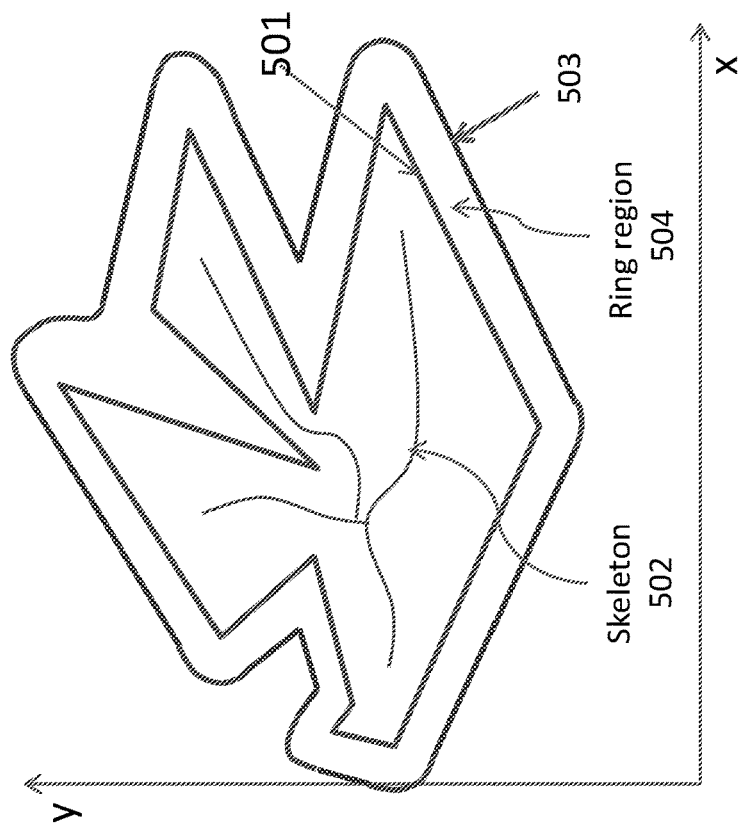
FIG. 5B illustrates an example of a skeleton of an over-exposed region.
Figure 5A:
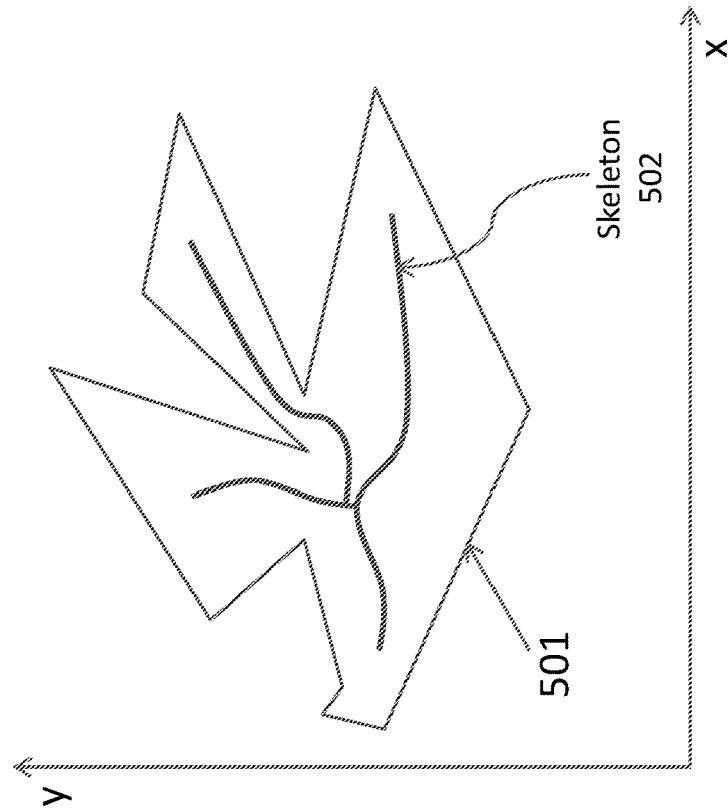
FIG. 5A illustrates an example of a skeleton of an over-exposed region.

Block 302 may determine a skeleton for each over-exposed region(s). In one example, the skeleton may be determined for an arbitrarily shaped over-exposed region 501 as shown in FIG. 5A. FIG. 5A illustrates an exemplary skeleton 502 determined for an over-exposed region 501.

In one example, block 302 may determine a skeleton based on a medial axis algorithm. The pixels within the over-exposed region that lie on the skeleton may be indicated by the set $S=\{s_i\}$. This set of pixels S may also be referred to as skeleton pixels.

The skeleton determined by block 302 may indicate the center of the shape of the over exposed region being evaluated. Skeletonization allows fitting a two dimensional luminance profile with an over-exposed region into one or more fittings of a one dimensional luminance profile between points of an edge of the region and points on a skeleton.

Block 303 may determine luminance values along the skeleton from block 302. Block 303 may determine luminance values for each pixel that is part of the skeleton line(s). With the outline of the over-exposed region available in addition to the skeleton of the same region, a plausible luminance profile to be applied to this region will typically be characterized by having the lowest luminance values at the border of the region, and the highest luminance values at the pixel locations of the skeleton.

In one example, block 303 may determine peak luminance values for pixels that lie on the skeleton. The set of pixels that lie on the skeleton may be indicated as $S=\{s_i\}$. In one example, each pixel in the set S may be assigned the same luminance value. Alternatively, the luminance values assigned to each pixel in the set S may vary.

In one example, block 303 may determine the luminance values L for each pixel $s_i$ in accordance with the principles described in connection with Equation Nos. 1, 3, 4, 6, 8, 9, 10, 11, 12 and 14 below. As used herein, $L(s_i)$ may indicate a luminance value of a pixel $s_i$, the pixel $s_i$ being located along the skeleton.

In one example, block 303 may determine a peak luminance for each pixel of set S. The peak luminance may be determined based on a specified value, which may be either a relative or an absolute value:

$$L(s_i)=k \qquad \text{Equation No. 1:}$$

The specified value k may be specified by a user, a standard, the peak luminance of a transmission system, or the peak luminance of a display device.

In another example, the peak luminance for each pixel in S may be determined based on luminance or luminance gradient values of pixels outside the over-exposed regions. For example, the peak luminance may be determined based on luminance values of the pixels in the well-exposed ring around the over-exposed area. The well-exposed ring may be determined in accordance with principles described in connection with block 304 below. The set of pixels that form a ring around the over-exposed region may be indicated as $P=\{p_i\}$. In one example, the maximum luminance $L_{p,max}$ of the pixels in set P is determined as follows:

$$L_{p,max} = \max_{p_i \in P} L(p_i) \qquad \text{Equation No. 2}$$

The value of $L_{p,max}$ may be less than a maximum value that can be encoded within a single image (e.g., 255 for an 8-bit input image or may higher than 255 if the image has been passed through a declipping algorithm).

The location of one or more pixels of pixel set P with a luminance equal to $L_{p,max}$ may be identified as $p_{max}$, i.e. $L(p_{max})=L_{p,max}$. If multiple pixels in set P have a luminance value of $L_{p,max}$, then the location of one of these pixels is selected (for example at random) and this pixel location is identified with $p_{max}$. In one example, the peak luminance of pixels along the skeleton may be determined based on a maximum luminance of pixels in the set P (e.g., $L_{p,max}$ from Equation No. 2). The set P may be determined in accordance with the principles described in connection with block 304 below.

In another example, the luminance $L(s_i)$ of the pixels $s_i$ along the skeleton may be determined by the peak luminance $L_{p,max}$ multiplied by the minimum Euclidean distance between the skeleton pixels and pixel $p_{max}$. The luminance may be determined as follows:

$$L(s_i) = L_{p,max} \min_{s_k \in S}(\|p_{max} - s_k\|) \qquad \text{Equation No. 3}$$

In Equation No. (3), $\|p_{max} - s_k\|$ is the Euclidian distance between pixels $p_{max}$ and $s_k$. All pixels $s_i$ may have the same luminance value.

In another example, the luminance values of skeleton pixels $s_i$ may be determined based on a minimum distance between a given skeleton pixel and edge pixels. For example, the luminance $L(s_i)$ for each skeleton pixel $s_i$ may be determined as the peak boundary luminance $L_{p,max}$ multiplied by the minimum Euclidean distance between skeleton pixels $s_i$ and the location of the boundary pixels in set P. The luminance values $L(s_i)$ of pixels on the skeleton may be determined as follows:

$$L(s_i) = L_{p,max} \min_{p_k \in P}(\|p_k - s_i\|) \qquad \text{Equation No. 4}$$

where skeleton pixels $s_i$ may receive different luminance values.

In another example, optionally, the luminance of the skeleton may be determined based on an additional reshaping which may increase or decrease the luminance of the skeleton. In one example, the reshaping may be based on features determined during classification of the over-exposed region. For instance, over-exposed regions may be classified as having their origin as a light source, a specular highlight, or a diffuse region. This may be written as:

$$C_r = \{\text{Light Source}|\text{Specular}|\text{Diffuse}\}, \qquad \text{Equation No. 5}$$

where $C_r$ is the classification for region r. Other classifications may be possible. It is possible to associate a scaling factor α with each class that may be subsequently used in one or more of Equation Nos 6, 8, 9, 11, 12 and 14. Such association may be achieved as follows:

$$\alpha = \begin{cases} \alpha_1 & \text{if } C_r = \text{Light Source} \\ \alpha_2 & \text{if } C_r = \text{Specular} \\ \alpha_3 & \text{if } C_r = \text{Diffuse} \end{cases} \qquad \text{Equation No. 5a}$$

In one example, the luminance values of the skeleton pixels may be determined based on a classification of the expected scene content underlying the over-exposed region. In one example the luminance of the skeleton pixels may be determined based on Equation No. 3, multiplied by the region classification-specific scaling factor α as presented in Equation No. 5a:

$$L(s_i) = \alpha L_{p,max} \min_{s_k \in S}(\|p_{max} - s_k\|) \qquad \text{Equation No. 6}$$

The right-hand side of Equation No. 4 may also be multiplied by the scaling factor determined in Equation No. 5a to yield classification-specific skeleton luminance values.

In one example, the peak luminance values of the skeleton pixels may be determined based on the luminance values and gradient values of the pixels in the set P.

As used herein, the gradient of a pixel $p_i$ can be written as $\nabla p_i$. The gradient is vector-valued, providing a horizontal gradient in the x-direction and a vertical gradient in the y-direction. The gradients may be determined based on the difference between the pixel value of the right neighbor and the pixel value of the current pixel to compute the horizontal gradient, and to take the difference between the pixel value of a vertical neighbor and the pixel value of the current pixel to compute the vertical gradient. This is called forward differencing, and it may be determined as follows:

$$\nabla p_i = (p_{i,x+1} - p_{i,x}, p_{i,y+1} - p_{i,y}) \qquad \text{Equation No. 7:}$$

Alternatively, the gradients may be determined based on backward or central differencing schemes.

In one example, the peak luminance of pixels along the skeleton that uses gradient information may be determined based on the pixels surrounding the over-exposed region. For example, the peak luminance may be determined by finding the maximum gradient magnitude of the pixels in the set P, denoted with $$\max_{p_l \in P}(\|\nabla p_l\|)$$

and multiplying this gradient with the maximum luminance value in set P, i.e. $L_{p,max}$ incremented by the minimum distance between the skeleton and $p_{max}$. This can be adjusted based on the region classification of Equation No. 5 by multiplying by α:

$$L(s_i) = \alpha \left( L_{p,max} + \min_{s_k \in S}(\|p_{max} - s_k\|) \max_{p_l \in P}(\|\nabla p_l\|) \right) \qquad \text{Equation No. 8}$$

Equation No. 8 uses the maximum gradient magnitude of all the pixels in the set P. An alternative example would use the gradient magnitude $\|\nabla p_{max}\|$ of the pixel $p_{max}$ that has the largest luminance value of all pixels in P, namely $L_{p,max}$, based on the following:

$$L(s_i) = \alpha\left(L_{p,max} + \min_{s_k \in S}(\|p_{max} - s_k\|)\|\nabla p_{max}\|\right) \quad \text{Equation No. 9}$$

The skeleton luminance value determinations in Equation Nos. 1, 3, 4, 6, 8 and 9 each result in luminance values that are identical for all the pixels $s_i$ in the set S. In other examples, the luminance determination of the skeleton pixels $s_i$ of set S may be based on criteria that result in different luminance values $L(s_i)$ for the different skeleton pixels $s_i$. The examples given in the following Equation Nos. 10, 11, 12 and 14 describe examples of skeleton luminance determinations that may result into different luminance values for different pixels $s_i$. In these equations, this can be understood by noting that the subscript i occurs on both the left hand side and the right hand side.

In one example, each skeleton pixel may receive a different luminance value based on modifying Equation No. 9 by dividing the second term by the Euclidean distance between the skeleton pixel $s_i$ and pixel $p_{max}$. This results in skeleton luminance values that are larger for skeleton pixels that are closer to pixel $p_{max}$. In addition, a user parameter $\beta$ may be introduced that could be used to account for the size of the region. This determination may be made as follows:

$$L(s_i) = \alpha\left(L_{p,max} + \beta\frac{\min_{s_k \in S}(\|p_{max} - s_k\|)}{\|p_{max} - s_i\|}\|\nabla p_{max}\|\right) \quad \text{Equation No. 10}$$

Skeleton pixels that are close to the border of an over-exposed region may beneficially receive a lower luminance than skeleton pixels that are further away from the border. For a given skeleton pixel, the minimum distance to the edge of the over-exposed region can be as $$\min_{p_k \in P}(\|p_k - s_i\|).$$

Rather than determine a single distance measure for all pixels in the skeleton as in Equation No. 8, namely $$\min_{s_k \in S}(\|p_{max} - s_k\|),$$

the following takes into account the distance to the border for each skeleton pixel individually:

$$L(s_i) = \alpha\left(L_{p,max} + \min_{p_k \in P}(\|p_{max} - s_i\|)\max_{p_l \in P}(\|\nabla p_l\|)\right) \quad \text{Equation No. 11}$$

The remaining terms in Equation No. 11 are the same as those in Equation No. 8. Likewise, Equation No. 9 may be modified to take into account the distance of each skeleton pixel to the border of its region. The resulting determination may be represented as follows, with the remaining terms being equal to those in Equation No. 9:

$$L(s_i) = \alpha\left(L_{p,max} + \min_{p_k \in P}(\|p_k - s_i\|)\|\nabla p_{max}\|\right) \quad \text{Equation No. 12}$$

The examples in Equation Nos. 11 and 12 take into account the minimum distance between a given skeleton pixel $s_i$ and the edge pixels of set P. It is possible to identify which edge pixel location is nearest to skeleton pixel $s_i$ as follows:

$$p_l = \underset{p_k \in P}{\operatorname{argmin}}(\|p_k - s_i\|) \quad \text{Equation No. 13}$$

The gradient magnitude at the edge pixel nearest to $s_i$ may then be determined with $\|\nabla p_l\|$ and the Euclidean distance between skeleton pixel $s_i$ and nearest edge pixel $p_l$ is given by $\|p_l - s_i\|$. The product of this gradient magnitude and this distance may be used to derive a luminance value for pixel $s_i$ according to:

$$L(s_i) = \alpha(L_{p,max} + \|p_l - s_i\|\|\nabla p_l\|) \quad \text{Equation No. 14:}$$

After determining luminance values for the skeleton pixels $s_i$, there may remain many pixels inside the specular highlight region that are not lying on the skeleton. These pixels have so far not received a luminance value. However, the corrected luminance values of the remaining pixels in the specular highlight region may be determined based on the luminance values of the skeleton $L(s_i)$.

Figure 5C:
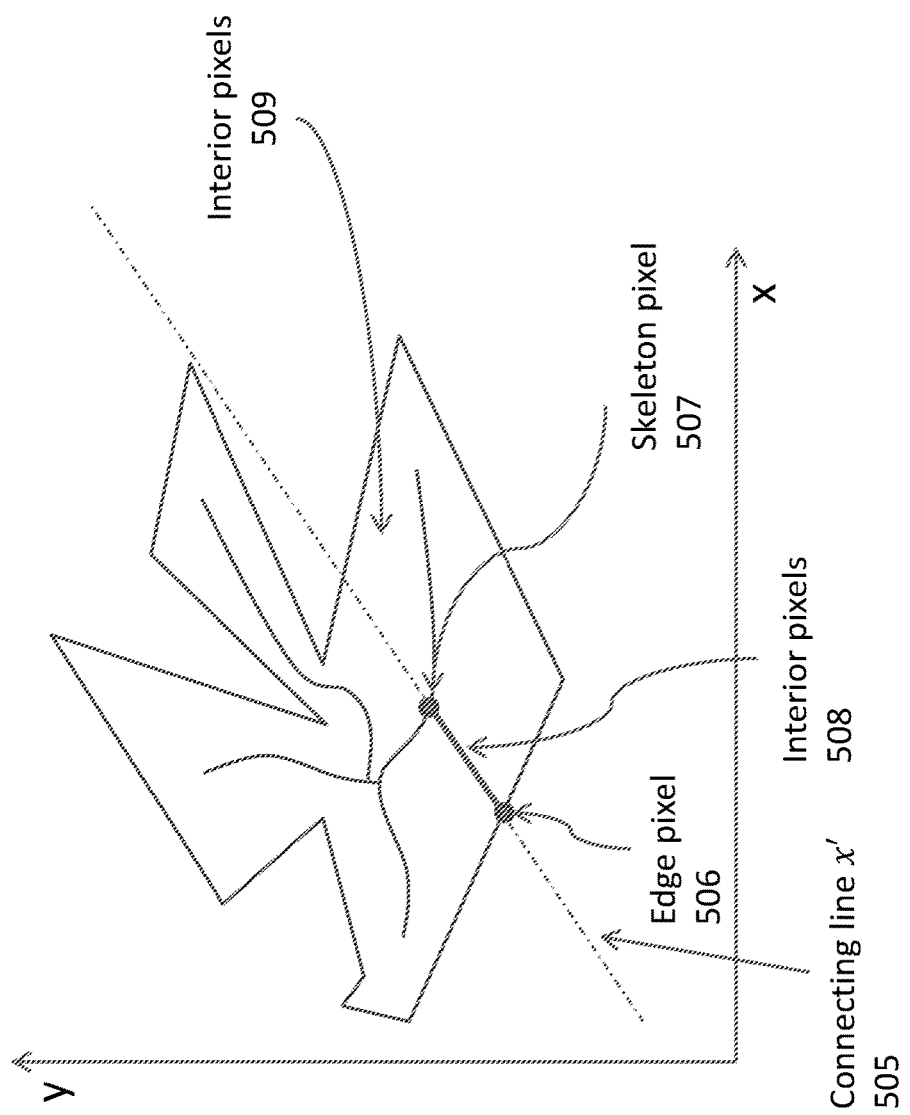
FIG. 5C illustrates an example of a skeleton of an over-exposed region.

Block 304 may determine edge pixels for each over-exposed region(s). In one example, block 304 may determine a ring of pixels surrounding each over-exposed region. The pixels in this ring may provide image details, such as edges, because they contain luminance and color variation. FIG. 5B illustrates a region 501, a skeleton 502, and a ring of pixels 503 surrounding the region 501. The width of this ring 503 of pixels may be identified by 504 in FIG. 5B. The width of the ring of pixels may be n pixels, with n≥1. The value of n may be determined empirically, or may be specified by the user. The pixels contained within the ring 503 may be well-exposed pixels. These ring pixels can be used to inform a region luminance correction algorithm. The pixels contained within this ring may be identified by the set P={$p_i$}. Pixel(s) inside an over-exposed region that do not lie on the skeleton may be identified as "interior pixel(s)". As shown in FIG. 5C, a line may connect the edge and the skeleton pixels 506 and 507. This line may illustrate a subset of interior pixels that will be reconstructed based on the edge and skeleton pixels 506 and 507

For the edge pixels determined by block 304, block 306 may determine a slope and block 305 may determine one or more directions. In one example, block 305 may determine a set of directions D. In one example, block 305 may determine a direction vector for each pixel $p_i$ in the set of boundary pixels P. These directions may be utilized to determine the pixels from set P that contribute to interior pixels. The set of directions may be denoted by D={$d_i$}, i.e. there is one direction associated with each pixel in the set P.

In one example, block 305 may determine direction vectors for pixels in set P based on the shape of an over-exposed region. Block 305 may determine direction vectors based on a tangent vector for each edge pixel. FIG. 6 illustrates the boundary of an over-exposed region 603, as well as a tangent 601 that is tangent an edge pixel, as well as a vector 602 that is orthogonal to the tangent 601. In one example, for each edge pixel, block 305 may determine a direction based on the vector (e.g., 602) orthogonal to a vector (e.g., 601) tangent to that edge pixel. Such an inward facing vector 602 may be denoted as $t_i$. In one example, a suitable direction vector may be determined by setting $d_i = t_i$.

In another example, block 305 may determine a direction vector $d_i$ for each pixel $p_i$ in the set P based on the gradient vectors $\nabla p_i$ of pixels $p_i$ in the set P by setting $d_i = \nabla p_i$.

In a further example, block 305 may determine direction vectors $d_i$ for pixels in set P based on isophote directions. Isophote vectors $\nabla^\perp p_i$ are defined as vectors orthogonal to the corresponding gradient vectors:

$$\nabla^\perp p_i = -\frac{\partial L(p_i)}{\partial y}\vec{x} + \frac{\partial L(p_i)}{\partial x}\vec{y} \quad \text{Equation No. 15}$$

The isophote vectors $\nabla^\perp p_i$ resulting from Equation No. 15 could be interpreted as the tangents of image features such as edges, and may be used to determine the set of direction vectors, i.e. $d_i = \nabla^\perp p_i$.

Further, the gradient $\nabla p_i$ at each pixel $p_i$ may be projected onto $t_i$ which is a vector orthogonal to the tangent. The projection $t_{i,p}$ of the gradient vector onto $t_i$ may be determined according to:

$$t_{i,p} = \frac{t_i}{|t_i|^2}(t_i \cdot \nabla p_i) \quad \text{Equation No. 16}$$

In this example, a suitable direction vector may be determined as $d_i = t_{i,p}$. Likewise, the isophote vectors $\nabla^\perp p_i$ may be projected onto $t_i$:

$$t_{i,p} = \frac{t_i}{|t_i|^2}(t_i \cdot \nabla^\perp p_i) \quad \text{Equation No. 17}$$

In this example, suitable direction vectors may be set according to $d_i = t_{i,p}$, where $t_{i,p}$ is determined with the use of Equation No. 17. The vector orthogonal to the tangent of each skeleton pixel $s_j$ may be defined as $u_j$. The vectors $u_j$ and $-u_j$ will intersect the edge of the over-exposed region at positions $p_n$ and $p_m$. The direction vectors recorded for pixels $p_n$ and $p_m$ are then $d_n = -u_j$ and $d_m = u_j$.

In one example, block 306 may determine luminance slopes for edge pixels determined by block 304. In one example, a set of slopes $G = \{g_i\}$ is determined for each pixel in the set P. In one example, this set of slopes may be determined based on the magnitude of gradients $\nabla p_i$ of the pixels $p_i$ in set P, as follows:

$$g_i = \|\nabla p_i\| \quad \text{Equation No. 18:}$$

Block 307 may determine luminance values for each pixel in the over-exposed region. Block 307 may correct and/or reconstruct luminance values of pixels of the over-exposed region(s) based on the information determined by blocks 302, 303, 304, 305 and/or 306. For example, the direction vectors from block 305 may be used synthesize luminance values for the pixels interior to the over-exposed region.

In one example, block 307 may determine luminance values for pixels in the interior of an over-exposed region (e.g., within the area identified by 509 of FIG. 5C) based on one or more skeleton pixels $s_i$ and on one or more pixels located on the region's boundary (i.e. one or more pixels drawn from the set P). FIG. 5C illustrates an exemplary line 505 connecting an edge pixel 506 with a skeleton pixel 507. The pixels 508 on the line 505 between pixels 506 and 507 may be reconstructed by block 307 based on information retrieved from the edge and skeleton pixels 506 and 507.

Figure 4A:
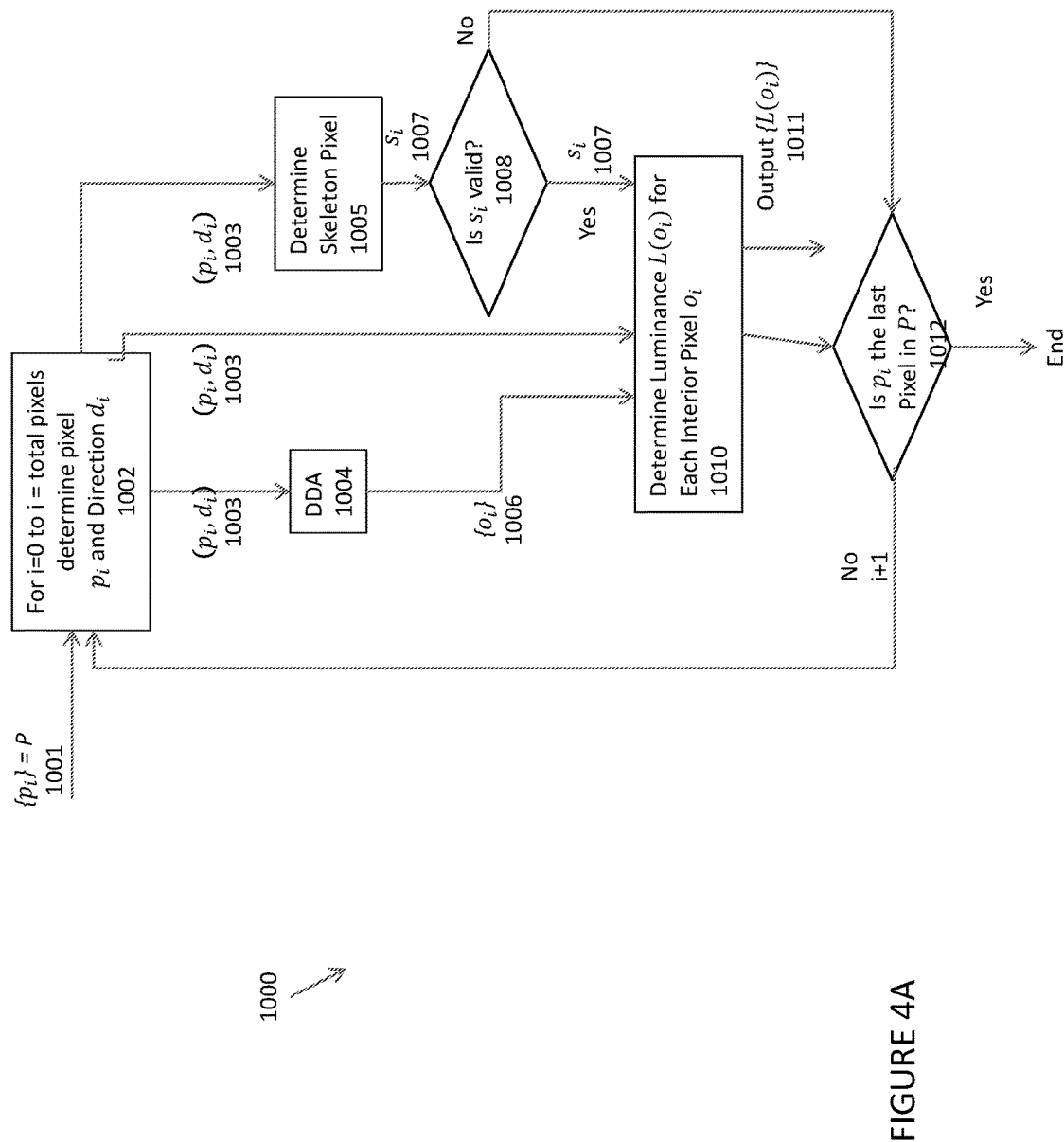
FIG. 4A is a diagram depicting an exemplary method in accordance with present principles.
Figure 4B:
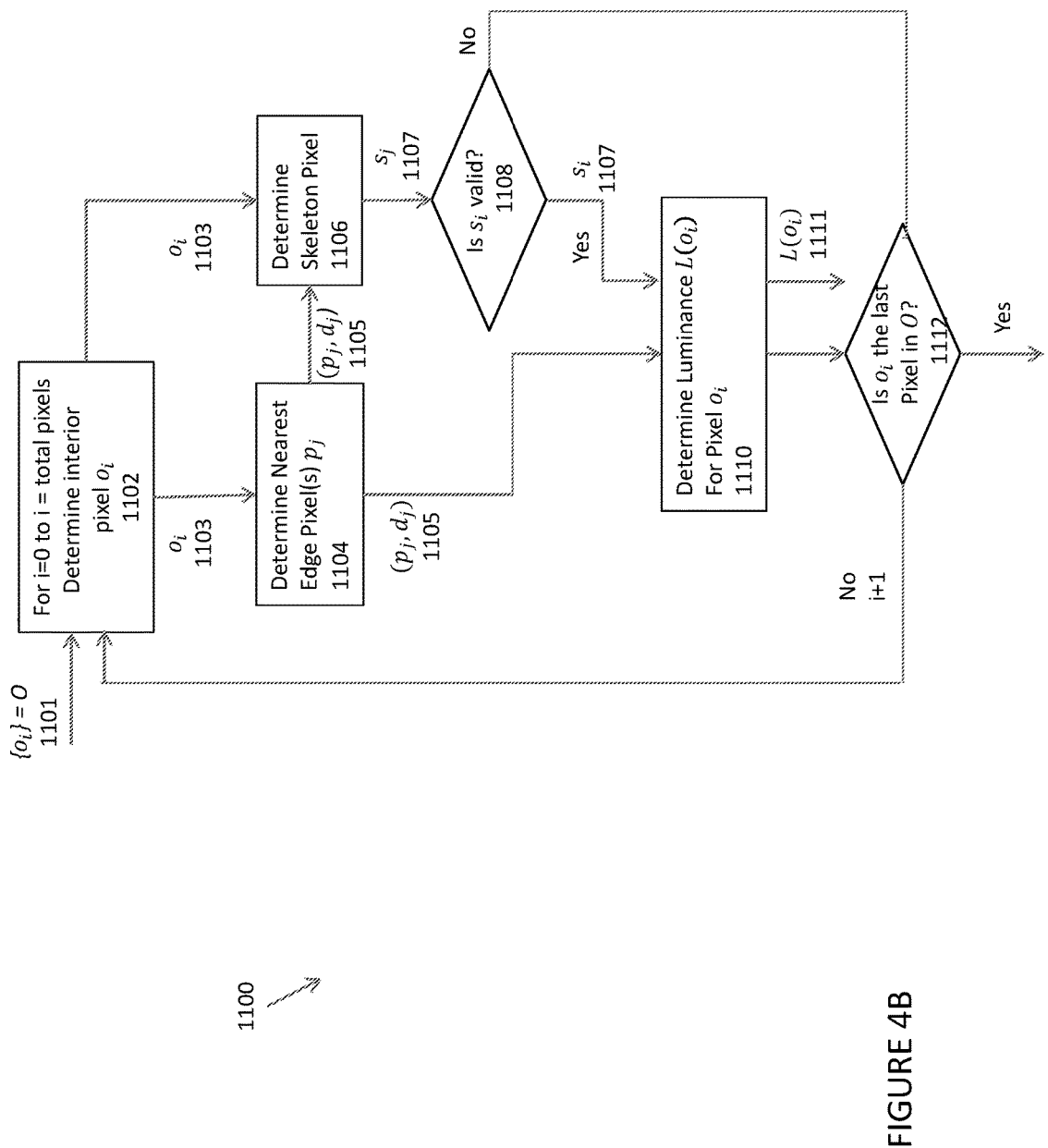
FIG. 4B is a diagram depicting an exemplary method in accordance with present principles.

Exemplary processes to determine corrected luminance values $L(o_i)$ according to block 307 are illustrated in FIGS. 4A and 4B.

FIG. 4A illustrates an exemplary method 1000 for correcting luminance values. In one example, block 307 may determine corrected luminance values for pixel(s) within the over-exposed region(s) according to method 1000. Method 1000 may determine luminance values for pixels that lie along one or more of the direction vectors D (e.g., determined by block 305). For example, a set of pixels that lie in-between a skeleton pixel $s_i$ and the pixel $p_i$ may be determined based on edge pixel $p_i$ in conjunction with direction vector $d_i$. These pixels may be the pixels that are corrected in accordance with method 1000. FIG. 7 illustrates an example of such candidate pixels 704, for direction vector $d_i$ 701, skeleton pixel $s_i$ 702 and the edge pixel $p_i$ 703. In one example, block 307 may determine a corrected luminance value $L(o_i)$ for a set of pixels interior to overexposed region(s).

FIG. 4A illustrates a method 1000 for determining corrected luminance values $L(o_i)$ for pixels of an over-exposed region. The method 1000 may commence based on receiving a set of edge pixels 1001. In one example, the edge pixels 1001 may be received from block 304. Method 1000 may review all the edge pixels $p_i$ in the set P (i.e. all pixels $p_0$, $p_1$, $p_2$, ... and their corresponding directions $d_0$, $d_1$, $d_2$, ... ). In one example, block 1002 may loop from i=0 to i=total edge pixels−1. For each value of i, block 1002 may determine an edge pixel $p_i$ and a direction $d_i$. For each pixel $p_i$ and its associated (normalized) direction vector $d_i$ (labeled as $p_i$, $d_i$ 1003), block 1004 may apply a Bresenhams Digital Differential Analyzer (DDA) algorithm to determine the subset of the interior pixels $o_i$ that lie on an line segment defined by edge pixel $p_i$, direction vector $d_i$ and skeleton pixel $s_i$.

Block 1005 may determine a skeleton pixel based on edge pixel and direction vector $p_i$, $d_i$ 1003. Block 1005 may output a skeleton pixel $s_i$ 1007. Block 1008 may determine if the skeleton pixel $s_i$ 1007 is a valid pixel. Block 1008 may determine if skeleton pixel $s_i$ 1007 is a valid pixel based on to line edge pixel and direction vector $p_i$, $d_i$ 1003. Block 1008 may determine if this line intersects the skeleton pixel $s_i$ 1007. Upon a negative determination by block 1008 (No), block 1008 may pass control to block 1012 to determine whether further processing is required. Alternatively, if block 1008 determines affirmatively (Yes) that the skeleton pixel $s_i$ is valid, then block 1008 may output the skeleton pixel $s_i$ 1007 to block 1010.

Block 1010 may determine a corrected luminance value for each pixel in a subset of interior pixels 1006. Block 1010 may determine a luminance value based on a luminance value of skeleton pixel $s_i$, a luminance of edge pixel $p_i$, a gradient magnitude $g_i$ (e.g., as determined by principles described in connection with Equation No. 18) and or other information derived from edge pixel $p_i$. Block 1010 may determine a corrected luminance value for the subset of interior pixels 1006 in accordance with the principles described in connection with Equation Nos. 20 to 26. Block 1010 may output corrected luminance values 1011 to block 1012.

Block 1012 may determine whether pixel $p_i$ determined by block 1002 is the last pixel in the pixel set P (by testing i<total_edge_pixels). If block 1012 determines an affirmative (Yes) determination, then method 1000 terminates and outputs the reconstructed luminance values 1011. If block 1012 determines a negative (No) determination then it may increment i by one and pass control back to block 1002.

FIG. 4B illustrates a method 1100 for determining corrected luminance values $L(o_i)$ for pixels of an over-exposed region. The method 1100 may commence based on receiving one or more interior pixels 1101. The pixels 1101 may be determined from by a mask M. In one example, block 1002 may loop from i=0 to i=interior pixels−1. For each value of i, block 1002 may determine an interior pixel $o_i$ 1003. Block 1102 may pass control to blocks 1104 and 1106.

Block 1104 may determine a best candidate edge pixel $p_j$ for interior pixel $o_i$ 1003. Block 1104 may review each edge pixel $p_j$ with corresponding direction vector $d_j$ to determine if $p_j$ is a suitable edge pixel to participate in the determination of a luminance value for interior pixel $o_i$. Block 1104 may determine if the pixel $o_i$ 1103 is sufficiently close to a line $p_j+td_j$, where $t \in [-\infty, \infty]$. Block 1104 may determine if pixel $o_i$ is sufficiently close based on a point-to-line distance test, producing a distance k.

Block 1104 may determine if this distance is sufficiently close or small based on:

$$k < \gamma t \qquad \text{Equation No. 19:}$$

where $\gamma$ is a fixed or user-determined scalar that determines a cone around $d_j$ with its apex at $p_j$. The wider this cone, the smaller the gaps in the over-exposed region left after the pixel adjustment step. Block 1104 may evaluate Equation No. 19 for all edge pixels $p_j$ and determine that multiple edge pixels are suitable to participate in the determination of a luminance value for interior pixel $o_i$. In one example, all edge pixels $p_j$ 1105 and direction vectors $d_j$ 1105 determined by block 1104 may be provided to block 1110. In an alternative example, the edge pixel that produced the smallest distance k may be selected as the single edge pixel $p_j$ with corresponding direction vector $d_j$ 1105.

Figure 8:
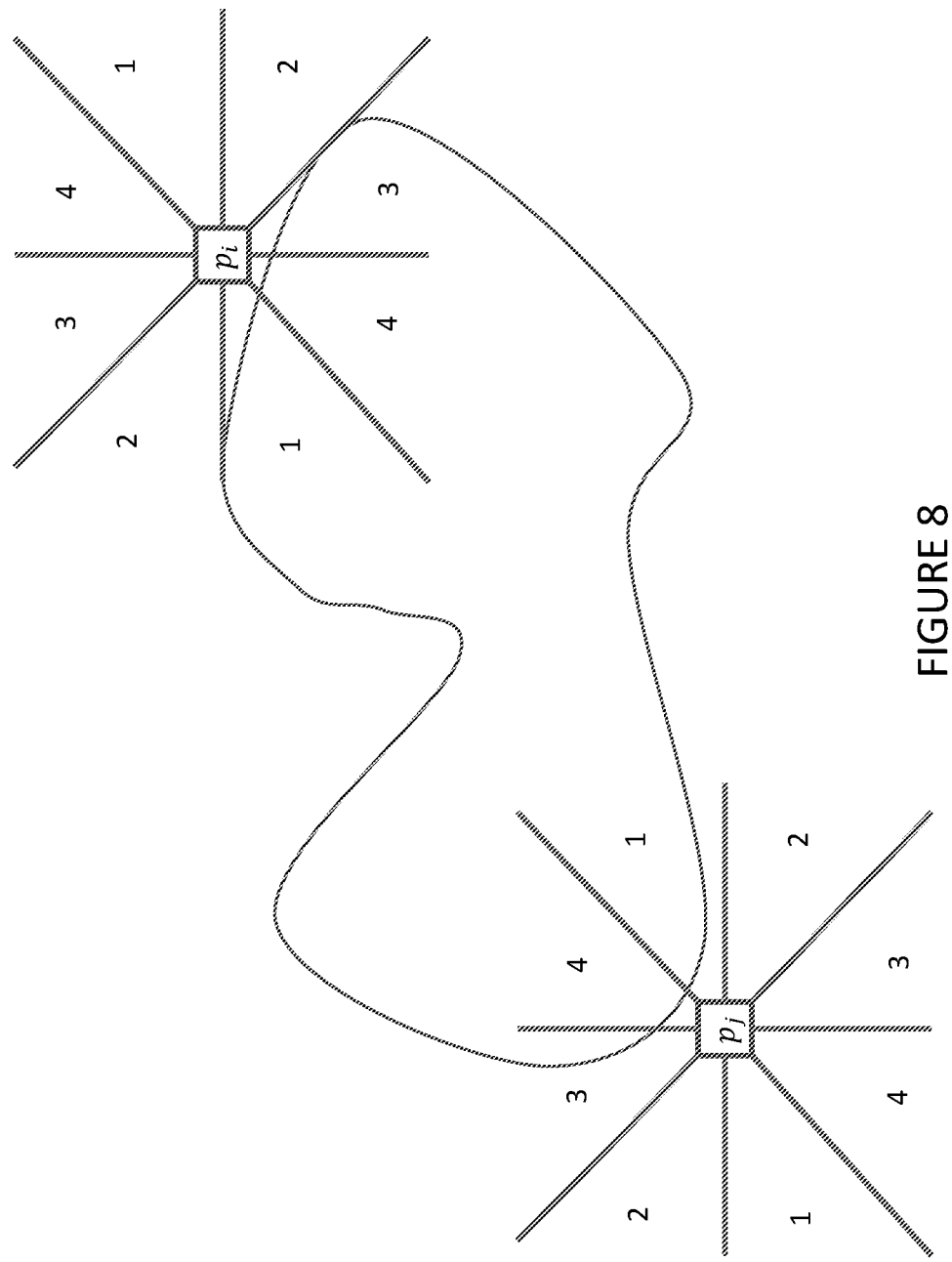
FIG. 8 illustrates an example of an over-exposed region and sectors.

In another example, block 1104 may determine if edge pixel $p_j$ is a suitable to participate in the determination of a luminance value for an interior pixel $o_i$, based on sectors around each pixel $p_j$ pixel. For example, as shown in FIG. 8, sectors may be labeled around each pixel $p_j$. The label assigned to pixel $p_j$ is then determined by the direction vector $d_j$. The orientation of the line segments $o_i$–$p_j$ gives rise to a second label. If a match is found between the two labels, then a luminance value can be calculated for interior location $o_i$ using the information associated with pixel $p_j$.

If block 1104 determines that pixel $p_j$ is suitable, then block 1104 may provide an edge pixel $p_j$ 1105 to blocks 1106 and 1110.

Block 1106 may determine a skeleton pixel $s_j$ 1107 based on edge pixel $p_j$ 1105 and interior pixel $o_i$ 1003. Block 1106 may perform a point-to-line distance measure to associate a skeleton pixel $s_j$ with the edge pixel $p_j$ 1105. Block 1106 may provide the skeleton pixel $s_j$ 1107 to block 1108. Block 1108 may determine if the skeleton pixel $s_j$ 1107 is a valid. Block 1108 may determine if a skeleton pixel because, as shown in FIG. 7, not all pixels $p_j$ may have an associated skeleton pixel. In FIG. 7, edge pixel $p_j$ 705 in conjunction with direction vector $d_j$ 706 defines a line that does not intersect the skeleton, but instead reaches the boundary of the over-exposed region at edge pixel $p_k$ 707. Block 1108 may determine if any skeleton pixel $s_j$ 1107 lies sufficiently close to the line defined by edge pixel $p_j$ 1105 and direction vector $d_j$ 1105 with the use of Equation No. 19.

In an alternative example, block 1104 may determine, for each pixel $o_i$ the nearest pixel $s_j$ and an edge pixel $p_j$ that lies on the line $s_j=t(o_i-s_j)$. In this example, block 1106 selects pixel $s_j$ 1107 nearest to $o_i$ and block 1108 always determines affirmative (Yes). In another example, block 1104 may determine, for each pixel $o_i$ the nearest pixel $p_j$ and block 1106 may determine the pixel $s_j$ nearest to pixel $o_i$. In this example, if $\|p_j-o_i\| \le \|s_j-o_i\|$, block 1104 may determine that edge pixel is pixel $p_j$. Otherwise block 1104 may determine that the edge pixel is a pixel $p_j$ that lies on the line $s_j=t(o_i-s_j)$.

If block 1108 determines that skeleton pixel $s_j$ 1107 is not a valid pixel (No) then it may pass control to block 1112. Otherwise, if block 1108 determines that skeleton pixel $s_j$ 1107 is a valid pixel (Yes), it may pass control to and skeleton pixel $s_j$ 1107 to block 1110. If the pixel, direction pair $p_j$, $d_j$ 1105 contains multiple edge and direction pixels, then block 1106 may determine multiple corresponding skeleton pixels $s_j$ 1107, and block 1108 may determine which of these skeleton pixels are valid using Equation No. 19, passing control and the set of valid skeleton pixels to block 1110.

Block 1110 may determine a reconstructed or corrected luminance value $L(o_i)$ 1111 for the interior pixel $o_i$ 1103. Block 1110 may determine a luminance value $L(o_i)$ 1111 for pixel $o_i$ based on its luminance, gradient or other derived information of an edge pixel $p_j$. Block 1110 may determine a corrected luminance value in accordance with the principles described in connection with Equation Nos. 20 to 26.

Block 1112 may determine whether pixel $o_i$ determined by block 1102 is the last pixel in the set of interior pixels (by testing i<total_pixels). If block 1112 determines an affirmative (Yes) determination, then method 1100 terminates and control is passed to block 308, which also receives the reconstructed luminance values 1111. If block 1112 determines a negative (No) determination then it may increment i by one and pass control back to block 1102.

In one example, blocks 1010, 1110 or 307 may determine a reconstructed luminance value for an interior pixel $(o_i)$ based on a luminance at the an edge pixel $L(p_j)$, a gradient $g_j$ at the edge pixel, a distance between the edge pixel and the interior pixel, and a user parameter $\eta$:

$$L(o_i) = \eta g_j \| p_j - o_i \| + L(p_j) \qquad \text{Equation No. 20:}$$

where $\eta$ is a user-parameter.

In another example, blocks 1010, 1110, or 307 may determine a luminance value for an over-exposed region's interior pixel $o_i$ based on a luminance at the skeleton $L(s_j)$. Instead of using the gradient $g_j$ at edge pixel $p_j$ as in Equation No. 20, it is possible to linearly interpolate between the luminance value $L(p_j)$ at the edge and the luminance value $L(s_j)$ on the skeleton, taking the spatial distance between $p_j$ and $s_j$ into account:

$$L(o_i) = \eta \frac{L(s_j) - L(p_j)}{\|p_j - s_j\|} \|p_j - o_i\| + L(p_j) \qquad \text{Equation No. 21}$$

In another example, blocks 1010, 1110 or 307 may determine a luminance value for an over-exposed region's interior pixel $o_i$ based on a non-linear interpolation. For example, blocks 1010, 1110 or 307 may determine a luminance value as follows:

$$L(o_i) = f\left(\frac{L(s_j) - L(p_j)}{\|p_j - s_j\|} \|p_j - o_i\|, \eta\right) + L(p_j) \qquad \text{Equation No. 22}$$

where examples of the non-linear function $f(\ )$ may be power functions, logarithmic or exponential functions, sigmoidal functions and trigonometric functions.

In another example, blocks 1010, 1110 or 307 may determine luminance based on several vectors $p_j+td_j$ that converge upon a single interior pixel $o_i$. In this case, the average value of each contribution may be determined as follows:

$$L(o_i) = \frac{1}{n}\sum_{\{p_j|o_i \text{near } p_j+td_j\}} \left(f\left(\frac{L(s_j)-L(p_j)}{\|p_j-s_j\|}\|p_j-o_i\|, \eta\right) + L(p_j)\right) \quad \text{Equation No. 23}$$

where n is the number of elements in the summation.

In another example, blocks 1010, 1110 or 307 may determine luminance values based on a classification of an over-exposed region. For example, if an over-exposed region is classified based on region type, (e.g., specular highlights, diffuse surfaces, light sources), luminance may be determined based on non-linear scaling function that is selected accordingly. In one example, blocks 1010, 1110 or 307 may determine luminance based on a non-linear function for a specular region. In one example, this function may have a steep gradient near skeleton pixels. In one example, blocks 1010, 1110 or 307 may determine luminance for specular highlight regions based on the following:

$$L(o_i) = \frac{1}{n}\sum_{\{p_j|o_i \text{near } p_j+td_j\}} \left(f_{spec}\left(\frac{L(s_j)-L(p_j)}{\|p_j-s_j\|}\|p_j-o_i\|, \eta\right) + L(p_j)\right) \quad \text{Equation No. 24}$$

In one example, blocks 1010, 1110 or 307 may determine luminance for diffuse regions based on the following:

$$L(o_i) = \frac{1}{n}\sum_{\{p_j|o_i \text{near } p_j+td_j\}} \left(f_{diff}\left(\frac{L(s_j)-L(p_j)}{\|p_j-s_j\|}\|p_j-o_i\|, \eta\right) + L(p_j)\right) \quad \text{Equation No. 25}$$

In one example, blocks 1010, 1110 or 307 may determine luminance for light source regions based on the following:

$$L(o_i) = \frac{1}{n}\sum_{\{p_j|o_i \text{near } p_j+td_j\}} \left(f_{light}\left(\frac{L(s_j)-L(p_j)}{\|p_j-s_j\|}\|p_j-o_i\|, \eta\right) + L(p_j)\right) \quad \text{Equation No. 26}$$

Block 308 may perform pixel interpolation. After luminance correction or reconstruction, some pixels in the over-exposed region may not yet have received a luminance values, leaving gaps in the reconstructed luminance profile. Block 308 may fill in remaining gaps in an over-exposed region. Block 308 may perform (bi-)linear interpolation. In another example, block 308 may perform higher-order interpolation.

Block 309 may perform pixel refinement. After pixel interpolation, every pixel in the over-exposed region has received a luminance value $L(o_i)$. However, the luminance values in the over-exposed region may not yet form a smooth profile as neighboring reconstructed luminance values may be significantly different, lacking consistency.

Block 309 may perform pixel refinement to improve consistency between neighboring reconstructed pixels. Block 309 may perform pixel refinement based on pixel luminance values $L(o_i)$ assembled into a 2D array or a vector L. Block 309 may perform an optimization to determine new values L' for the region (corresponding to $L'(o_i)$) according to the following objective function:

$$\operatorname*{argmin}_{L'}\|L'-L\|_2^2 \quad \text{Equation No. 27}$$

Equation No. 27 requires additional constraints to be imposed to achieve the desired effect of improving the consistency of the luminance profile. Equation Nos. 28 to 32 describe a set of constraints, of which one or more may be added to the optimization of Equation No. 27. For example, block 309 may determine pixel values based on an optimization that includes a constraint that requires reconstructed luminance values to be larger than the maximum luminance of the edge pixels $p_j$. This constraint can be formulated as follows:

$$\min(L(o_i))-\max(L(p_j))>T_1 \quad \text{Equation No. 28:}$$

where $T_1$ is a threshold which may be set to 0, or alternatively may be set to a value larger than 0.

Another constraint that may be considered by block 309 during optimization may require that the output values $L'(o_i)$ are not lower than the luminance values of the input image. Denoting the original luminance values with $L_{orig}(o_i)$, this constraint may be formulated as:

$$L'(o_i)-L_{orig}(o_i)>T_2 \quad \text{Equation No. 29:}$$

where $T_2$ is a threshold which may be set to 0, or alternatively may be set to a value larger than 0.

Another constraint that may be considered by block 309 during optimization may require that the skeleton pixels have luminance values higher than the remaining interior pixels in a region. Block 309 may incorporate this constraint for each scanline individually, so that for each scanline of the region, the constraint may be formulated as follows:

$$\|L'(o_i(y))\|_\infty - L'(s(y)) < T_3 \quad \text{Equation No. 30:}$$

where $T_3$ is a threshold with a positive value. If a scanline contains multiple skeleton pixels, then maximal values would be assigned by block 309 to skeleton pixels in descending order of their distance to the clipped region's border.

The constraint of Equation No. 30 is formulated on scan lines (i.e. pixel rows). Block 309 may incorporate a further constraint that operates on pixel columns, but is otherwise identical to the constraint shown in Equation No. 30:

$$\|L'(o_i(x))\|_\infty - L'(s(x)) < T_3 \quad \text{Equation No. 31:}$$

Another constraint that may be considered by block 309 during optimization may require a gradually, monotonically-increasing transition from pixels outside the over-exposed region to skeleton pixels. For each pixel along a given direction $p_j+td_j$, block 309 may determine that the luminance values should be non-decreasing. Thus, pixels that are further away from $p_j$ their resulting luminance values should be higher, leading to the following constraint:

$$L'(p_j+t_1 d_j) \geq L'(p_j+t_2 d_j) \text{ if } t_1 > t_2 \quad \text{Equation No. 32:}$$

Block 309 may output a smoothed luminance profile for each over-exposed region in an image, which is suitable to be merged with the remaining (well-exposed) pixels of the input image.

In one example, block 207 may perform the merging of the reconstructed luminance values output by block 309 with the well exposed pixels of the input image. Block 207 may replace the over-exposed luminance values with reconstructed luminance values. In one example, the luminance values can be merged with the output of an inpainting algorithm In one example, merging the luminance values with the inpainting output may be performed based on RGB color values output of the inpainting algorithm, denoted with $(R_I(o_j), G_I(o_j), B_I(o_j))$. The luminance of the inpainted pixels may be determined as a weighted average of the three color values. The luminance value may be denoted with $L_I(o_j)$. The arithmetic average of the inpainted luminance values is denoted $L_{av}$. The luminance profile $L(o_j)$ output by block 309 may be superimposed upon the inpainted pixel values as follows:

$$\begin{pmatrix} R(o_j) \\ G(o_j) \\ B(o_j) \end{pmatrix} = \begin{pmatrix} R_I(o_j) \\ G_I(o_j) \\ B_I(o_j) \end{pmatrix} - \begin{pmatrix} L_{av} \\ L_{av} \\ L_{av} \end{pmatrix} + \begin{pmatrix} L(o_j) \\ L(o_j) \\ L(o_j) \end{pmatrix} \quad \text{Equation No. 33}$$

Equation No. 33 may be performed by block 307 when the reconstructed luminance profile output by block 309 and the output of the inpainting method are additive. In case a multiplicative approach is required, an intermediate luminance value for each pixel in the over-exposed region may be determined by block 307 as follows:

$$L'' = \frac{L_I(o_j) - L_{av} + L(o_j)}{L_I(o_j)} \quad \text{Equation No. 34}$$

The output RGB color values are then determined by block 307 with:

$$\begin{pmatrix} R(o_j) \\ G(o_j) \\ B(o_j) \end{pmatrix} = \begin{pmatrix} R_I(o_j) L'' \\ G_I(o_j) L'' \\ B_I(o_j) L'' \end{pmatrix} \quad \text{Equation No. 35}$$

The principles described in connection with Equations Nos. 33, 34 and 35 may be performed in a color opponent space (or any other space which separates luminance from chrominance), for a luminance channel, without affecting the chrominance channels.

Figure 9:
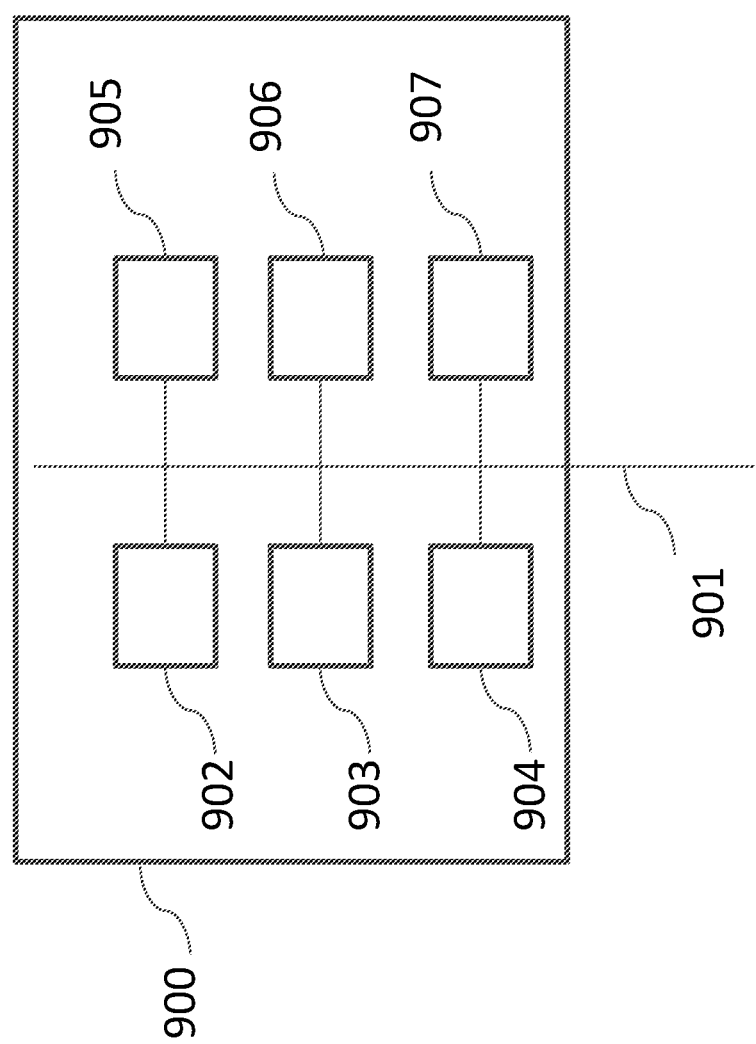
FIG. 9 is a diagram depicting an exemplary apparatus in accordance with present principles.

FIG. 9 represents an exemplary architecture of an apparatus 900 which may be configured to implement methods described in relation with FIGS. 1, 2 and 3 and Equation Nos. 1 to 32.

Apparatus 900 comprises following elements that are linked together by a data and address bus 901:
- a microprocessor 902 (or CPU), which is, for example, a DSP (or Digital Signal Processor);
- a ROM (or Read Only Memory) 903;
- a RAM (or Random Access Memory) 904;
- an I/O interface 905 for reception of data to transmit, from an application; and
- a battery 906 (or other suitable power source).

According to a variant, the battery 906 is external to the apparatus. In each of mentioned memory, the word «register» used in the specification can correspond to area of small capacity (some bits) or to very large area (e.g. a whole program or large amount of received or decoded data). ROM 903 comprises at least a program and parameters. Algorithm of the methods according to the invention is stored in the ROM 903. When switched on, the CPU 902 uploads the program in the RAM and executes the corresponding instructions.

RAM 904 comprises, in a register, the program executed by the CPU 902 and uploaded after switch on of the apparatus 900, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or an apparatus), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

According to a specific example of image processing, the image or picture I is obtained from a source. For example, the source belongs to a set comprising:
- a local memory (903 or 904), e.g. a video memory or a RAM (or Random Access Memory), a flash memory, a ROM (or Read Only Memory), a hard disk;
- a storage interface (905), e.g. an interface with a mass storage, a RAM, a flash memory, a ROM, an optical disc or a magnetic support;
- a communication interface (905), e.g. a wireline interface (for example a bus interface, a wide area network interface, a local area network interface) or a wireless interface (such as a IEEE 802.11 interface or a Bluetooth® interface); and
- an image capturing circuit (e.g. a sensor such as, for example, a CCD (or Charge-Coupled Device) or CMOS (or Complementary Metal-Oxide-Semiconductor)).

According to different embodiments, the decoded image $\hat{I}$ is sent to a destination; specifically, the destination belongs to a set comprising:
- a local memory (903 or 904), e.g. a video memory or a RAM, a flash memory, a hard disk;
- a storage interface (905), e.g. an interface with a mass storage, a RAM, a flash memory, a ROM, an optical disc or a magnetic support;
- a communication interface (905), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, Wi-Fi® or a Bluetooth® interface); and
a display.

According to different examples, the bitstream BF and/or F are sent to a destination. As an example, one of bitstream F and BF or both bitstreams F and BF are stored in a local or remote memory, e.g. a video memory (904) or a RAM (904), a hard disk (903). In a variant, one or both bitstreams are sent to a storage interface (905), e.g. an interface with a mass storage, a flash memory, ROM, an optical disc or a magnetic support and/or transmitted over a communication interface (905), e.g. an interface to a point to point link, a communication bus, a point to multipoint link or a broadcast network.

According to different examples, the bitstream BF and/or F is obtained from a source. Exemplarily, the bitstream is read from a local memory, e.g. a video memory (904), a RAM (904), a ROM (903), a flash memory (903) or a hard disk (903). In a variant, the bitstream is received from a storage interface (905), e.g. an interface with a mass storage, a RAM, a ROM, a flash memory, an optical disc or a magnetic support and/or received from a communication interface (905), e.g. an interface to a point to point link, a bus, a point to multipoint link or a broadcast network.

According to different examples, apparatus 900 being configured to implement methods in accordance with present principles, belongs to a set comprising:
a mobile device;
a communication device;
a game device;
a tablet (or tablet computer);
a laptop;
a still image camera;
a video camera;
an encoding chip;
a still image server; and
a video server (e.g. a broadcast server, a video-on-demand server or a web server).

According to different examples, apparatus 900 being configured to implement an image processing process in accordance with present principles, belongs to a set comprising:
a mobile device;
a communication device;
a game device;
a set top box;
a TV set;
a tablet (or tablet computer);
a laptop;
a display and
a decoding chip.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example, or to carry as data the actual syntax-values written by a described example. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

Numerous specific details have been set forth herein to provide a thorough understanding of the present invention. It will be understood by those skilled in the art, however, that the examples above may be practiced without these specific details. In other instances, well-known operations, components and circuits have not been described in detail so as not to obscure the present invention. It can be appreciated that the specific structural and functional details disclosed herein may be representative and do not necessarily limit the scope of the present invention.

Various examples of the present invention may be implemented using hardware elements, software elements, or a combination of both. Some examples may be implemented, for example, using a computer-readable medium or article which may store an instruction or a set of instructions that, if executed by a machine, may cause the machine to perform a method and/or operations in accordance with the examples. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus and constituents included therein, for example, a processor, an encoder and a decoder, may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

The invention claimed is:

1. An image processing method comprising:
   determining a corrected luminance value for at least a pixel of an over-exposed region determined from a standard dynamic range (SDR) image;
   wherein the corrected luminance value is determined based on at least one of a shape of a skeleton of pixels of the over-exposed region, and edge information of a ring of pixels surrounding the over-exposed region.

2. The method of claim 1, wherein the over-exposed region is an irregularly shaped region.

3. The method of claim 1, further comprising determining the type of the over-exposed region and determining the corrected luminance based on the type of the over-exposed region.

4. The method of claim 3, wherein the type is one of a specular highlight region, diffuse, or light sources.

5. The method of claim 1, wherein luminance is corrected based on peak luminance of pixels along the skeleton.

6. The method of claim 1, wherein the luminance is corrected based on edges determined based on the ring of pixels.

7. The method of claim 1, wherein the luminance is corrected based on direction vectors determined based on the ring of pixels.

8. The method of claim 7, wherein the direction vectors are determined based on isophote vectors of the ring of pixels.

9. The method of claim 7, wherein the direction vectors are determined based on gradients of the ring of pixels.

10. The method of claim 1, wherein luminance is corrected based on a luminance at the edge pixel $L(p_j)$, a gradient $g_j$ of an edge pixel, a distance between the edge pixel and the interior pixel, and a user parameter $\eta$ as follows:

$$L(o_i) = \eta g_j \|p_j - o_i\| + L(p_j).$$

11. The method of claim 1, wherein luminance is corrected based on a luminance at the skeleton $L(s_j)$, a luminance at the edge pixel $L(p_j)$, a distance between the edge pixel and the interior pixel, a distance between the edge pixel and the skeleton pixel, and a user parameter $\eta$ as follows:

$$L(o_i) = \eta \frac{L(s_j) - L(p_j)}{\|p_j - s_j\|} \|p_j - o_i\| + L(p_j).$$

12. The method of claim 1, further comprising refining the corrected luminance based on the optimization:

$$\operatorname*{argmin}_{L'} \|L' - L\|_2^2$$

subject to one or more of the constraints $$\min(L(o_i)) - \max(L(p_j)) > T_1$$

$$L'(o_i) - L_{orig}(o_i) > T_2$$

$$\|L'(o_i(y))\|_\infty - L'(s(y)) < T_3$$

$$\|L'(o_i(x))\|_\infty - L'(s(x)) < T_3$$

$$L'(p_j + t_1 d_j) \geq L'(p_j + t_2 d_j) \text{ if } t_1 > t_2$$

that are based on relationships between optimized luminance values $L'(o_i)$, the luminance of edge pixels $L(p_j)$, luminance values of the input image $L_{orig}(o_i)$, optimized luminance values of skeleton pixels $L'(s(y))$, edge pixels $p_j$, direction vectors $d_j$, thresholds $T_1$, $T_2$, $T_3$ and scalars $t_1$ and $t_2$.

13. An apparatus for image processing, the apparatus comprising a processor configured to determine a corrected luminance value for at least a pixel of an over-exposed region determined from a standard dynamic range (SDR) image;

wherein the corrected luminance value is determined based on at least one of a shape of a skeleton of pixels of the over-exposed region, and edge information of a ring of pixels surrounding the over-exposed region.

14. The apparatus of claim 13, wherein the over-exposed region is an irregularly shaped region.

15. The apparatus of claim 13, further comprising determining the type of the over-exposed region and determining the corrected luminance based on the type of the over-exposed region.

16. The apparatus of claim 15, wherein the type is one of a specular highlight region, diffuse, or light sources.

17. The apparatus of claim 13, wherein luminance is corrected based on peak luminance of pixels along the skeleton.

18. The apparatus of claim 13, wherein the luminance is corrected based on edges determined based on the ring of pixels.

19. The apparatus of claim 13, wherein the luminance is corrected based on direction vectors determined based on the ring of pixels.

20. The apparatus of claim 19, wherein the direction vectors are determined based on isophote vectors of the ring of pixels.

21. The apparatus of claim 19, wherein the direction vectors are determined based on gradients of the ring of pixels.

22. The apparatus of claim 13, wherein luminance is corrected based on a luminance at the edge pixel $L(p_j)$, a gradient $g_j$ of an edge pixel, a distance between the edge pixel and the interior pixel, and a user parameter $\eta$ as follows:

$$L(o_i) = \eta g_j \|p_j - o_i\| + L(p_j).$$

23. The apparatus of claim 13, wherein luminance is corrected based on a luminance at the skeleton $L(s_j)$, a luminance at the edge pixel $L(p_j)$, a distance between the edge pixel and the interior pixel, a distance between the edge pixel and the skeleton pixel, and a user parameter $\eta$ as follows:

$$L(o_i) = \eta \frac{L(s_j) - L(p_j)}{\|p_j - s_j\|} \|p_j - o_i\| + L(p_j).$$

24. The apparatus of claim 13, further comprising refining the corrected luminance based on the optimization:

$$\operatorname*{argmin}_{L'} \|L' - L\|_2^2$$

subject to one or more of the constraints $$\min(L(o_i)) - \max(L(p_j)) > T_1$$

$$L'(o_i) - L_{orig}(o_i) > T_2$$

$$\|L'(o_i(y))\|_\infty - L'(s(y)) < T_3$$

$$\|L'(o_i(x))\|_\infty - L'(s(x)) < T_3$$

$$L'(p_j + t_1 d_j) \geq L'(p_j + t_2 d_j) \text{ if } t_1 > t_2$$

that are based on relationships between optimized luminance values $L'(o_i)$, the luminance of edge pixels $L(p_j)$, luminance values of the input image $L_{orig}(o_i)$, optimized luminance values of skeleton pixels $L'(s(y))$, edge pixels $p_j$, direction vectors $d_j$, thresholds $T_1$, $T_2$, $T_3$ and scalars $t_1$ and $t_2$.

25. An electronic device comprising the apparatus of claim 13.

26. The electronic device of claim 25 selected from the group consisting of a set top box, a computer, a smartphone and a laptop.

* * * * *